(12) United States Patent
Akao

(10) Patent No.: US 12,274,312 B2
(45) Date of Patent: Apr. 15, 2025

(54) POWER SUPPLY UNIT PROVIDED TO INHALATION DEVICE, INHALATION DEVICE, AND METHOD FOR OPERATING POWER SUPPLY UNIT

(71) Applicant: Japan Tobacco Inc., Tokyo (JP)

(72) Inventor: Takeshi Akao, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 547 days.

(21) Appl. No.: 17/481,508

(22) Filed: Sep. 22, 2021

(65) Prior Publication Data

US 2022/0000186 A1 Jan. 6, 2022

Related U.S. Application Data

(63) Continuation of application No. PCT/JP2020/003111, filed on Jan. 29, 2020.

(30) Foreign Application Priority Data

Apr. 9, 2019 (JP) .................................. 2019-073891

(51) Int. Cl.
*A24F 40/57* (2020.01)
*A24F 40/51* (2020.01)
(Continued)

(52) U.S. Cl.
CPC .............. *A24F 40/90* (2020.01); *A24F 40/51* (2020.01); *A24F 40/57* (2020.01); *H02J 7/007192* (2020.01)

(58) Field of Classification Search
None
See application file for complete search history.

(56) References Cited

U.S. PATENT DOCUMENTS

2006/0192927 A1 8/2006 Ikeuchi et al.
2014/0334804 A1* 11/2014 Choi .................... A24F 40/485
392/404
(Continued)

FOREIGN PATENT DOCUMENTS

EP 3646744 A2 * 5/2020 ............. A24F 40/30
EP 3750413 A2 * 12/2020 ............. A24B 15/16
(Continued)

OTHER PUBLICATIONS

International Search Report (PCT/ISA/210) issued in PCT/JP2020/003111, mailed on Mar. 10, 2020.
(Continued)

*Primary Examiner* — Jennifer L Norton
(74) *Attorney, Agent, or Firm* — Birch, Stewart, Kolasch & Birch, LLP

(57) ABSTRACT

A power supply unit is for an inhalation device and is controlled so as to flexibly respond to the detection of a temperature anomaly in the controller. A power supply unit is provided to an inhalation device and includes; a battery; a controller that controls the charging operation of the battery as well as the discharging operation f the battery when the source of an inhalation component is vaporized or atomized; and a temperature measurer that measures the temperature of the controller. The controller causes the temperature measurer to measure the temperature of the controller in a first cycle during the charging operation and in a second cycle during the discharging operation, and assesses the temperature state of the power supply unit in accordance with the measurement results.

15 Claims, 10 Drawing Sheets

(51) Int. Cl.
*A24F 40/90* (2020.01)
*H02J 7/00* (2006.01)

(56) References Cited

U.S. PATENT DOCUMENTS

| | | | | |
|---|---|---|---|---|
| 2015/0173419 A1* | 6/2015 | Tu | ............................ | A24F 40/51 |
| | | | | 131/329 |
| 2015/0237917 A1 | 8/2015 | Lord | | |
| 2017/0079329 A1* | 3/2017 | Zitzke | .................. | H05B 1/0225 |
| 2020/0136415 A1* | 4/2020 | Akao | ..................... | H02J 7/0068 |
| 2020/0197634 A1* | 6/2020 | Mizuguchi | ............ | A61M 11/042 |
| 2020/0352254 A1* | 11/2020 | Yamada | .................... | A24F 40/60 |
| 2021/0007411 A1* | 1/2021 | Nakano | ..................... | A24F 40/53 |
| 2022/0125122 A1* | 4/2022 | Robert | ..................... | A24F 40/50 |
| 2022/0287373 A1* | 9/2022 | Lin | .......................... | A24F 40/10 |
| 2023/0200453 A1* | 6/2023 | Kilger | ...................... | A24F 40/30 |
| | | | | 131/329 |
| 2024/0000157 A1* | 1/2024 | Yamada | .................... | A24F 40/10 |
| 2024/0306728 A1* | 9/2024 | Akao | .................. | H01M 10/425 |
| 2024/0332985 A1* | 10/2024 | Yamada | .................... | A24F 40/50 |
| 2024/0381941 A1* | 11/2024 | Mizuguchi | ............. | G05B 15/02 |
| 2024/0398014 A1* | 12/2024 | Lee | ............................ | A24F 40/50 |
| 2024/0398036 A1* | 12/2024 | Bilat | ........................ | A24F 40/20 |
| 2024/0407456 A1* | 12/2024 | Jung | ........................ | A24F 40/51 |

FOREIGN PATENT DOCUMENTS

| | | |
|---|---|---|
| JP | 2005-27360 A | 1/2005 |
| JP | 2011-47875 A | 3/2011 |
| JP | 2012-227983 A | 11/2012 |
| JP | 2017-518733 A | 7/2017 |
| JP | 2017-79747 A | 8/2017 |
| WO | WO 2015/165813 A1 | 11/2015 |

OTHER PUBLICATIONS

Japanese Office Action for Japanese Application No. 2019-073891, dated Jul. 1, 2019, with English translation.

* cited by examiner

POWER SUPPLY UNIT PROVIDED TO INHALATION DEVICE, INHALATION DEVICE, AND METHOD FOR OPERATING POWER SUPPLY UNIT

CROSS REFERENCE TO RELATED APPLICATIONS

The present application is a continuation application of International Application No. PCT/JP2020/003111, filed on Jan. 29, 2020, which claims priority under 35 U.S.C. 119(a) to Japanese Application No. 2019-073891, filed in Japan on Apr. 9, 2019, all of which are hereby expressly incorporated by reference into the present application.

TECHNICAL FIELD

The present disclosure relates to a power supply unit installed in an inhaler device, an inhaler device, and a method for operating a power supply unit. More specifically, it relates to a power supply unit which is installed in an inhaler device for generating an inhaled component, such as aerosol or flavor-added aerosol, which is inhaled by a user; an inhaler device; and a method for operating a power supply unit.

BACKGROUND ART

A technique for judging whether it is safe to manipulate an inhaler device by a user, at the time when the inhaler device is started, has been know. For example, Patent Literature 1 discloses a technique for judging safety with respect to an electronic steam supply device, by comparing, by use of a computer, environment temperature around the device, that is periodically read by a temperature sensor, with a temperature threshold value.

CITATION LIST

Patent Literature

PTL 1: Japanese Patent Application Public Disclosure No. 2017-079747

SUMMARY OF INVENTION

Technical Problem

In an inhaler device such as an electronic cigarette, a nebulizer, or the like which is generally used, it is necessary to quickly raise temperature of a heater for quickly atomize an inhaled component source, when an inhalation action of a user is detected. For raising the temperature of the heater, it is necessary to apply large current to the heater to increase consumed electric power. In such a case, as a result, large current flows similarly through a controller which comprises an electric circuit module, so that temperature abnormality may occur in the controller.

If the temperature abnormality state in the controller is continued, the controller will enter an abnormal state thereof, and the inhaler device will be led thereby to a breakdown thereof (it will become unusable, or the like). Thus, in the case that there is a risk of occurrence of temperature abnormality in the controller, it is desirable to quickly detect the temperature abnormality for avoiding a breakdown of an inhaler device itself. Especially, regarding the case wherein a scene that large current is applied to a controller can be seen, it is assumed that there are two such cases mainly, specifically, a case when a battery is being charged and a case when a battery is being discharged; so that, with respect to each of the above two cases, it is desirable to quickly detect temperature abnormality.

An example of a method for quickly detecting temperature abnormality in a controller is a method for measuring, in a short cycle, temperature of the controller. However, in an inhaler device such as an electronic cigarette, a nebulizer, or the like which is generally used, a space for housing a battery is physically limited usually. Thus, it is difficult to house a large-capacity battery which allows short-cycle measurement. Even if a system for measuring temperature of a controller in accordance with a short cycle could be adopted, a problem that the life of the battery is shortened will arise.

The present invention has been achieved in view of the above matters. That is, an object of the present disclosure is to provide a power supply unit of an inhaler device, which is controlled to be able to flexibly correspond to detection of temperature abnormality in a controller. Further, an object of the present disclosure is to provide a power supply unit of an inhaler device, which can maintain and improve battery performance, even if there is physical restriction such that the space for housing the battery is small. Further, an object of the present disclosure is to provide an inhaler device which comprises a power supply unit such as that explained above.

In addition, the other object of the present disclosure is to provide a power supply unit and an inhaler device comprising the power supply unit which take points of view of energy conservation and environmental preservation into consideration. In more detail, an object is to provide a power supply unit and an inhaler device which are environmentally friendly, by lowering the frequency of disposal of articles by further extending the life of a battery and further extending the life of a device by protecting each of various kinds of devices from failure, and/or by preventing unnecessary consumption of component sources that are to be inhaled.

Solution to Problem

For solving the above-explained problem, according to an embodiment of the present disclosure, a power supply unit is provided; wherein the power supply unit is that which is installed in an inhaler device, and comprises: a battery; a controller for controlling charging operation of the battery and discharging operation, that is performed when atomizing or vaporizing an inhaled component source, of the battery; and a temperature measurer for measuring temperature of the controller: wherein the controller makes the temperature measurer measure temperature of the controller, in accordance with a first cycle during the charging operation and in accordance with a second cycle during the discharging operation, and, in response to result of the measurement, judges the temperature state of the power supply unit.

In the power supply unit in an embodiment, the first cycle is longer than the second cycle.

In the power supply unit in an embodiment, in the case that it is judged that the temperature state corresponds to temperature abnormality, the controller makes the battery stop the charging operation or the discharging operation.

In the power supply unit in an embodiment, the controller further makes the temperature measurer measure temperature of the controller in the case that puff action performed by a user is detected after the discharging operation is stopped, and, in the case that the measured temperature is in a predetermined first normal temperature range, makes the battery restart the discharging operation.

In the power supply unit in an embodiment, the controller further prohibits, permanently, the battery from performing the discharging operation, in the case that temperature abnormality is repeatedly detected through a predetermined prohibition-related number of times of puff actions in a row.

In the power supply unit in an embodiment, the controller further measures temperature of the controller by using the temperature measurer, in the case that connection of the power supply unit to an external electric power source is detected after stopping of the charging operation; and makes the battery restart the charging operation, in the case that the measured temperature is in a predetermined second normal temperature range.

In the power supply unit in an embodiment, the controller further prohibits, permanently, the battery from performing the charging operation, in the case that temperature abnormality is detected through a predetermined prohibition-related number of times of charging operation in a row.

In the power supply unit in an embodiment, the controller judges that the temperature state corresponds to temperature abnormality, in the case that the measurement result shows that, during the discharging operation or during the charging operation, temperature of the controller, that is measured by the temperature measurer, is out of a first normal temperature range during the discharging operation or out of a second normal temperature range during the charging operation a predetermined number of consecutive times.

In the power supply unit in an embodiment, the power supply unit further comprises a notifier, and the controller makes the notification unit notify temperature abnormality, in the case that it is judged that the temperature state corresponds to temperature abnormality.

In the power supply unit in an embodiment, the first normal temperature range is different from the second normal temperature range.

In the power supply unit in an embodiment, the first normal temperature range is wider than the second normal temperature range.

In the power supply unit in an embodiment, the temperature measurement unit is constructed by using a temperature sensor which is further included in the power supply unit.

In the power supply unit in an embodiment, the temperature measurement unit is constructed to measure temperature of the controller by using a temperature characteristic of a diode which is further included in the controller.

In the power supply unit in an embodiment, the temperature measurement unit is constructed to measure temperature of the controller by using a temperature characteristic of a PTC thermistor which is included in the power supply unit.

In the power supply unit in an embodiment, an inhaled device to which the above-explained power supply unit is connected in an attachable/detachable manner is provided.

Further, according to an embodiment of the present disclosure, a method for operating a power supply unit which is installed in an inhaler device is provided: wherein the power supply unit comprises a controller for controlling charging operation of a battery and discharging operation, that is performed when atomizing or vaporizing an inhaled component source, of the battery: and the method comprises steps, that are performed by the controller, for obtaining, from a sensor, temperature of the controller in accordance with a first cycle during the charging operation and in accordance with a second cycle during the discharging operation; and judging the temperature state of the power supply unit, in response to the obtained temperature.

In the method in an embodiment, the first cycle is longer than the second cycle.

In the method in an embodiment, the method further comprises a step, that is performed by the controller, for making the battery stop the charging operation or the discharging operation, in the case that it is judged that the temperature state corresponds to temperature abnormality.

In the method in an embodiment, the method further comprises a step, that is performed by the controller, for judging that the temperature state corresponds to temperature abnormality, in the case that the measurement result shows that, during the discharging operation or during the charging operation, the obtained temperature of the controller is out of a first normal temperature range during the discharging operation or out of a second normal temperature range during the charging operation a predetermined number of consecutive times.

In the method in an embodiment, the first normal temperature range is wider than the second normal temperature range.

In the method in an embodiment, the power supply unit further comprises a notifier, and the method further comprises a step, that is performed by the controller, for making the notifier notify temperature abnormality, in the case that it is judged that the temperature state corresponds to temperature abnormality.

In the method in an embodiment, the method further comprises steps, that are performed by the controller, for obtaining temperature of the controller from the sensor in the case that puff action performed by a user is detected after the discharging operation is stopped, and making the battery restart the discharging operation in the case that the temperature is in a predetermined first normal temperature range.

In the method in an embodiment, the method further comprises a step, that is performed by the controller, for prohibiting, permanently, the battery from performing the discharging operation, in the case that temperature abnormality is detected through a predetermined prohibition-related number of times of puff actions in a row.

In the method in an embodiment, the method further comprises steps, that are performed by the controller, for obtaining temperature of the controller from the sensor, in the case that connection of the power supply unit to an external electric power source is detected after stopping of the charging operation; and making the battery restart the charging operation, in the case that the measured temperature is in a predetermined second normal temperature range.

In the method in an embodiment, the method further comprises a step, that is performed by the controller, for prohibiting, permanently, the battery from performing the charging operation, in the case that temperature abnormality is detected at each time through a predetermined prohibition-related number of times.

Further, according to an embodiment of the present disclosure, an inhaler device comprising a power supply unit and an atomization unit for atomizing or vaporizing an inhaled component source is provided: wherein the power supply unit comprises a battery, a controller for controlling operation to supply electric power from the battery to the atomization unit, and a temperature measurer for measuring temperature of the controller: wherein the controller makes the temperature measurer measure temperature of the controller, in accordance with a predetermined cycle, during operation to supply electric power to the atomization unit, and infers the temperature state of the inhaler device in response to result of the measurement.

In the inhaler device in an embodiment, the controller infers that the temperature state of the inhaler device corresponds to temperature abnormality, in the case that the measurement result shows that temperature of the controller, that is measured by the temperature measurer in accordance with the cycle, is out of a predetermined normal temperature range through a predetermined number of consecutive times.

In the inhaler device in an embodiment, the power supply unit further comprises a notifier, and the controller makes the notifier notify temperature abnormality, in the case that it is inferred that the temperature state corresponds to temperature abnormality.

In the inhaler device in an embodiment, in the case that it is inferred that the temperature state corresponds to temperature abnormality during operation to supply electric power to the atomization unit, the controller makes the battery stop the operation to supply electric power.

DESCRIPTION OF EMBODIMENTS

In the following description, embodiments of the present disclosure will be explained with reference to the figures. It should be reminded that, although the embodiments of the present disclosure include an electronic cigarette and a nebulizer, the embodiments are not limited to those including an electronic cigarette and a nebulizer. Embodiments of the present disclosure may include various types of inhaler devices which generate aerosol or flavor-added aerosol inhaled by users. Further, in addition to aerosol, an inhaled component source that is to be generated may include invisible vapor.

<Basic Construction of Inhaler Device>

Figure 1A:
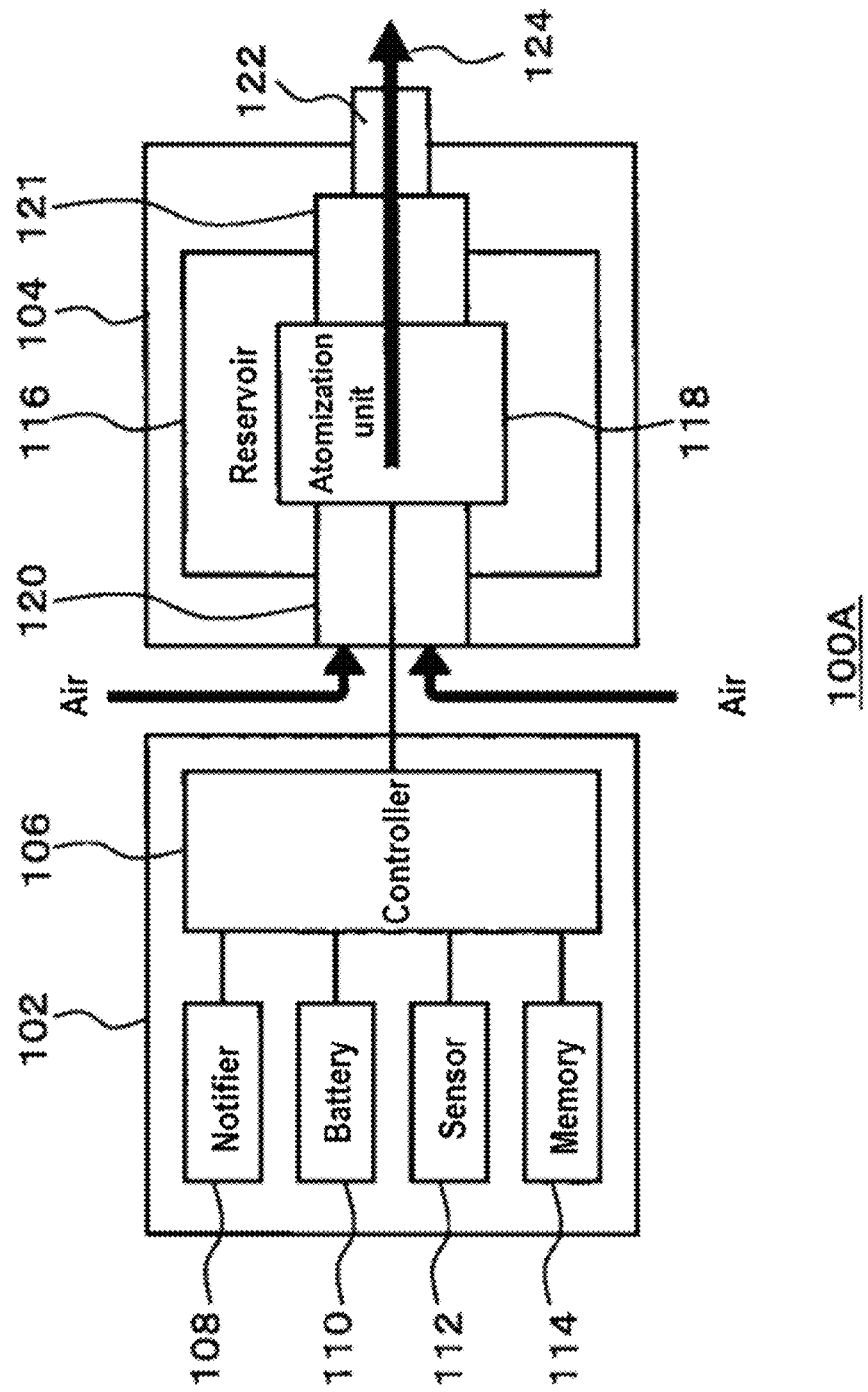
FIG. 1A is a schematic block diagram of a construction of an inhaler device.

FIG. 1A is a schematic block diagram of a construction of an inhaler device 100A according to an embodiment of the present disclosure. FIG. 1A is that which schematically and conceptually shows respective components included in the inhaler device 100A, and does not show precise arrangement, shapes, sizes, positional relationship, and so on of the respective components and the flavor inhaler 100.

As shown in FIG. 1A, the inhaler device 100A comprises a first member 102 and a second member 104. For example, as shown in the figure, the first member 102 may be a power supply unit, and may comprise a controller 106, a notifier 108, a battery 110, a sensor 112, and a memory 114. For example, the second member 104 may be a cartridge, and may comprise a reservoir 116, an atomization unit 118, an air taking-in flow path 120, an aerosol flow path 121, and a suction opening part 122. Part of components included in the first member 102 may be included in the second member 104. Part of components included in the second member 104 may be included in the first member 102. The second member 104 may be constructed to he attachable/detachable to/from the first member 102. Also, probably, all components included in the first member 102 and the second member 104 may be included in a single housing in place of the first member 102 and the second member 104.

A power supply unit, which is the first member 102, comprises the notifier 108, the battery 110, the sensor 112, and the memory 114, and is electrically connected to the controller 106. In the above components, the notifier 108 may comprise a light emitting element such as an LED, a display, a speaker, a vibrator, and so on. It is preferable that the notifier 108 provide a user with notification in various forms, by light emission, display, vocalization, vibration, or the like, or a combination thereof, as necessary. In an example, it is preferable that the first member 102, the second member 104, and the inhaler device 100A provide, in various forms, notification of temperature abnormality.

The battery 110 supplies electric power to the respective components, such as the notifier 108, the sensor 112, the memory 114, the atomization unit 118, and so on, in the inhaler device 100A. Especially, the battery 110 supplies electric power to the atomization unit 118 for atomizing an aerosol source in response to a puff action of a user. During the period of the above process, the battery 110 enters a discharging state. On the other hand, the battery 110 can be connected to an external electric power source (for example, a USB (Universal Serial Bus) connectable charger) via a predetermined port (not shown in the figure) installed in the power supply unit 102. During the period of the above process, the battery 110 enters a charging state it should be reminded that it may be constructed in such a manner that the battery 110 only can be detached from the power supply unit 102 or the inhaler device 110A, and can be replaced by a new battery 110. Also, probably, it may be constructed in such a manner that the battery 110 can he replaced by a new battery 112, by replacing the whole power supply unit 102 by a new power supply unit 102.

The sensor 112 may comprise a pressure sensor for detecting change in the pressure or a flow rate sensor for detecting a flow rate in the air taking-in flow path 120 and/or the aerosol flow path 121. Further, the sensor 112 may comprise a weight sensor for detecting the weight of a component such as the reservoir 116 or the like. Further, the sensor 112 may be constructed to detect the height of a liquid surface in the reservoir 116. Further, the sensor 112 may be constructed to detect an SOC (State of Charge, charge state) of the battery 110, and a discharging state, an integrated current value, a voltage, or the like of the battery 110. The integrated current value may be obtained by using a current integration method, an SOC-OCV (Open Circuit Voltage, open circuit voltage) method, or the like. Further, the sensor 112 may comprise a temperature sensor for measuring the temperature of the controller 106. Further, the sensor 112 may be a manipulation button which can be manipulated by a user, or the like.

The controller 106 may be an electronic circuit module constructed as a microprocessor or a microcomputer. The controller 106 may be constructed to control operation of the inhaler device 100A in accordance with computer-executable instructions stored in the memory 114. The controller 106 reads data from the memory 114 and uses the data for controlling the inhaler device 100A as necessary, and stores data in the memory 114 as necessary. In an example, the controller 106 may count the number of times of attempts of puffing performed by a user by using the inhaler device 100A, and store the number in the memory 114. Further, the sensor 112 may accumulate time of electrical conduction to the atomization unit 118. Further, it is preferable that the controller 106 perform various types of control relating to charging operation arid discharging operation.

The memory 114 is a storage medium such as a ROM (Read Only Memory), a RAM (Random Access Memory), a flash memory, or the like. The memory 114 may store, in addition to computer-executable instructions such as those explained above, setting data which are necessary for controlling the inhaler device 100A and/or the power supply unit 102, and may mainly be used by the controller 106. For example, the memory 114 may store various data such as methods for controlling the notifier 108 (modes of light emission, vocalization, vibration, etc., and so on), values detected by the sensor 112, history of healing relating to the atomization unit 118, and so on.

Regarding the cartridge which is the second member 104, the reservoir 116 holds an aerosol source. For example, the reservoir 116 comprises fibrous or porous material, and holds an aerosol source, which is in the form of liquid, by use of spaces between fibers or pores in the porous material. For example, cotton or glass fibers, or tobacco raw material, or the like, may be used as the above-explained fibrous or porous material. The reservoir 116 may be constructed as a tank for storing liquid. The aerosol source is liquid such as polyhydric alcohol, such as glycerin or propylene glycol, or water, or the like, for example. In the case that the inhaler device 100A is an inhaler for medical use, such as a nebulizer or the like, the aerosol source may also comprise a medicine that is to be inhaled by a patient. In a different example, the aerosol source may comprise a tobacco raw material or an extract originated from a tobacco raw material, which releases a fragrance-inhaling-taste component when it is heated. The reservoir 116 may have a construction which allows replenishment of a consumed aerosol source. Also, probably, the reservoir 116 may be constructed in such a manner that the reservoir 116 itself is allowed to be replaced when the aerosol source is exhausted. Further, the aerosol source is not limited to that in a liquid form, and it may be solid. In the case that the aerosol source is solid, the reservoir 116 may be a hollow container which does not use fibrous or porous material, for example.

The atomization unit 118 is constructed to generate aerosol from an aerosol source. In more detail, the atomization unit 118 generates aerosol by atomizing or vaporizing an aerosol source. In the case that the inhaler device 110A is a medical inhaler such as a nebulizer or the like, the atomization unit 118 generates aerosol by atomizing or vaporizing an aerosol source including a medicine. When a suction action (hereinafter, this action may be referred to as a "puff action," or, simply, a "puff") is detected by the sensor 112, the atomization unit 118 generates aerosol by receiving supply of electric power from the battery 110. For example, a wick (not show r in the figure) may be installed for connection between the reservoir 116 and the atomization unit 118. In the above case, a part of the wick extends to the inside of the reservoir 116 and is in contact with the aerosol source. The other part of the wick extends toward the atomization unit 118. The aerosol source is sent from the reservoir 116 to the atomization unit 118 by capillary effect in the wick. In an example, the atomization unit 118 comprises a heater which is electrically connected to the battery 110. The heater is arranged to be in contact with or to be positioned close to the wick. When a puff action is detected, the controller 106 controls the heater in the atomization unit 118 to heat an aerosol source, which is conveyed via the wick, to thereby atomize the aerosol source. The other example of the atomization unit 118 may be an ultrasonic-type atomizer which atomizes the aerosol source by ultrasonic vibration. The air taking-in flow path 120 is connected to the atomization unit 118, and the air taking-in flow path 120 leads to the outside of the inhaler device 100A. The aerosol generated in the atomization unit 118 is mixed with air that is taken via the air taking-in flow path 120. The fluid mixture comprising the aerosol and the air is sent to the aerosol flow path 121, as shown by an arrow 124. The aerosol flow path 121 has a tubular structure for sending the fluid mixture comprising the air and the aerosol, that is generated in the atomization unit 118, to the suction opening part 122.

The suction opening part 122 is constructed in such a manner that it is positioned at an end of the aerosol flow path 121, and makes the aerosol flow path 121 be opened toward the outside of the inhaler device 100A. A user can take air including the aerosol into the user's mouth by holding the suction opening part 122 in the user's mouth and performing a suction action.

Figure 1B:
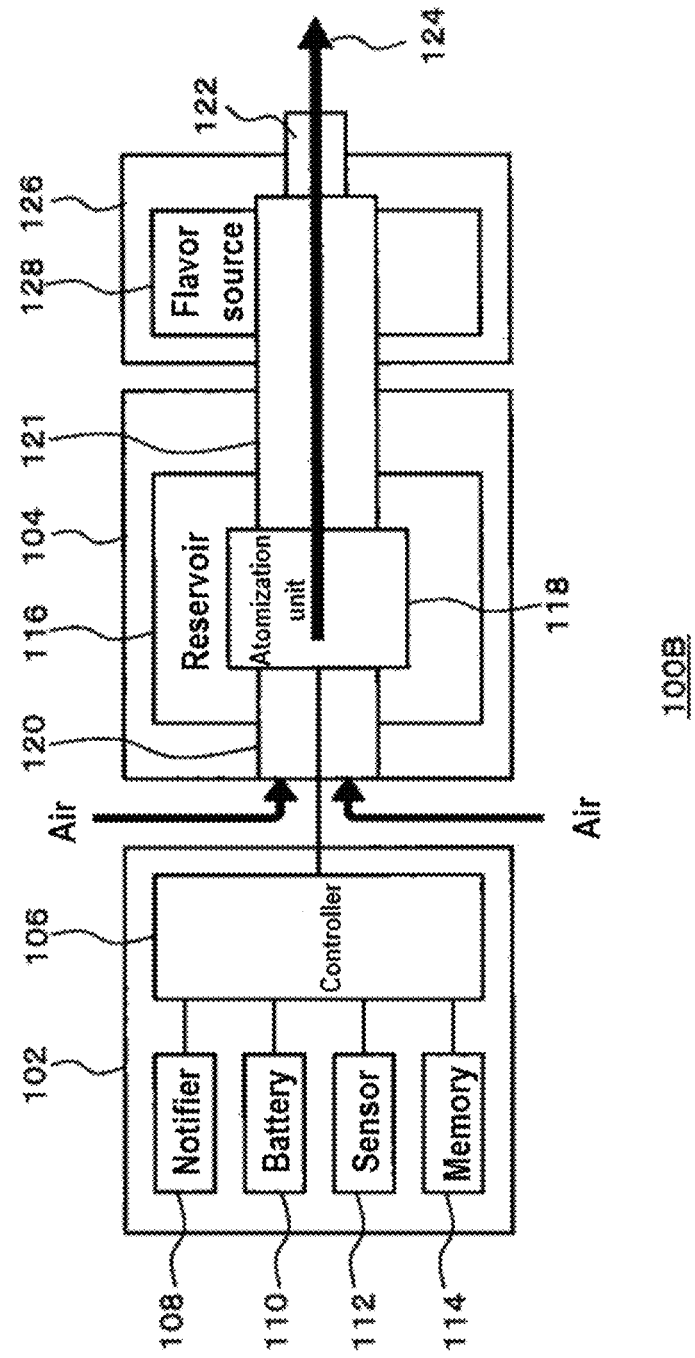
FIG. 1B is a schematic block diagram of a construction of an inhaler device.

FIG. 1B is a schematic block diagram of a construction of an inhaler device 100B according to an embodiment of the present disclosure. As shown in FIG. 1B, the inhaler device 100B comprises a third member 126, in addition to the constructions included in the inhaler device 100A in FIG. 1A. The third member 126 may be a capsule, and may comprise a flavor source 128. For example, in the case that the inhaler device 100B is an electronic cigarette, the flavor source 128 may comprise a fragrance-inhaling-taste component included in tobacco. As shown in the figure, the aerosol flow path 121 extends across the second member 104 and the third member 116. The suction opening part 122 is installed in the third member 126.

The flavor source 128 is a component for adding flavor to aerosol. The flavor source 128 is positioned in the middle of the aerosol flow path 121. The fluid mixture comprising the air and the aerosol generated by the atomization unit 118 (it should be reminded that the fluid mixture may simply be referred to as aerosol, hereinafter) flows to the suction opening part 122 through the aerosol flow path 121. In this manner, in the point of view of the flow of the aerosol, the flavor source 128 is arranged in a position downstream the atomization unit 118. In other words, in the aerosol flow path 121, the position of the flavor source 128 is closer to the suction opening part 122 than the position of the atomization unit 118. Thus, the aerosol generated in the atomization unit 118 passes through the flavor source 128 and thereafter arrives at the suction opening part 122. When the aerosol passes through the flavor source 128, fragrance-inhaling-taste components included in the flavor source 128 are added to the aerosol. For example, in the case that the inhaler device 100B is an electronic cigarette, the flavor source 128 may be that which originates from tobacco, such as shredded tobacco, a product which is made by processing tobacco raw material to have a granular form, a sheet form, or a powder form, or the like. Further, flavor source 128 may be that which does not originate from tobacco, such as a product made by use of a plant other than tobacco (for example, mint, a herb, and so on). For example, the flavor source 128 comprises a nicotine component. The flavor source 128 may comprise a flavor component such as menthol. In addition to the flavor source 128, the reservoir 116 may also have a material comprising a fragrance-inhaling-taste component. For example, the inhaler device 100B may be constructed in such a manner that the flavor source 128 holds flavor material which originates from tobacco and the reservoir 116 includes flavor material which does not originate from tobacco.

A user can take air including the aerosol, to which the flavor has been added, into the mouth by holding the suction opening part 122 in the user's mouth and performing a suction action.

<Power Supply Unit Included in Inhaler Device According to Embodiment>

The power supply units 102 installed in the inhaler devices 100A and 100B (hereinafter, they may collectively be referred to as an "inhaler device 100") according to the embodiments of the present disclosure are controlled by the controller 106 by using various kinds of method. In the following description, an embodiment of the present disclosure will be explained in detail.

Figure 2:
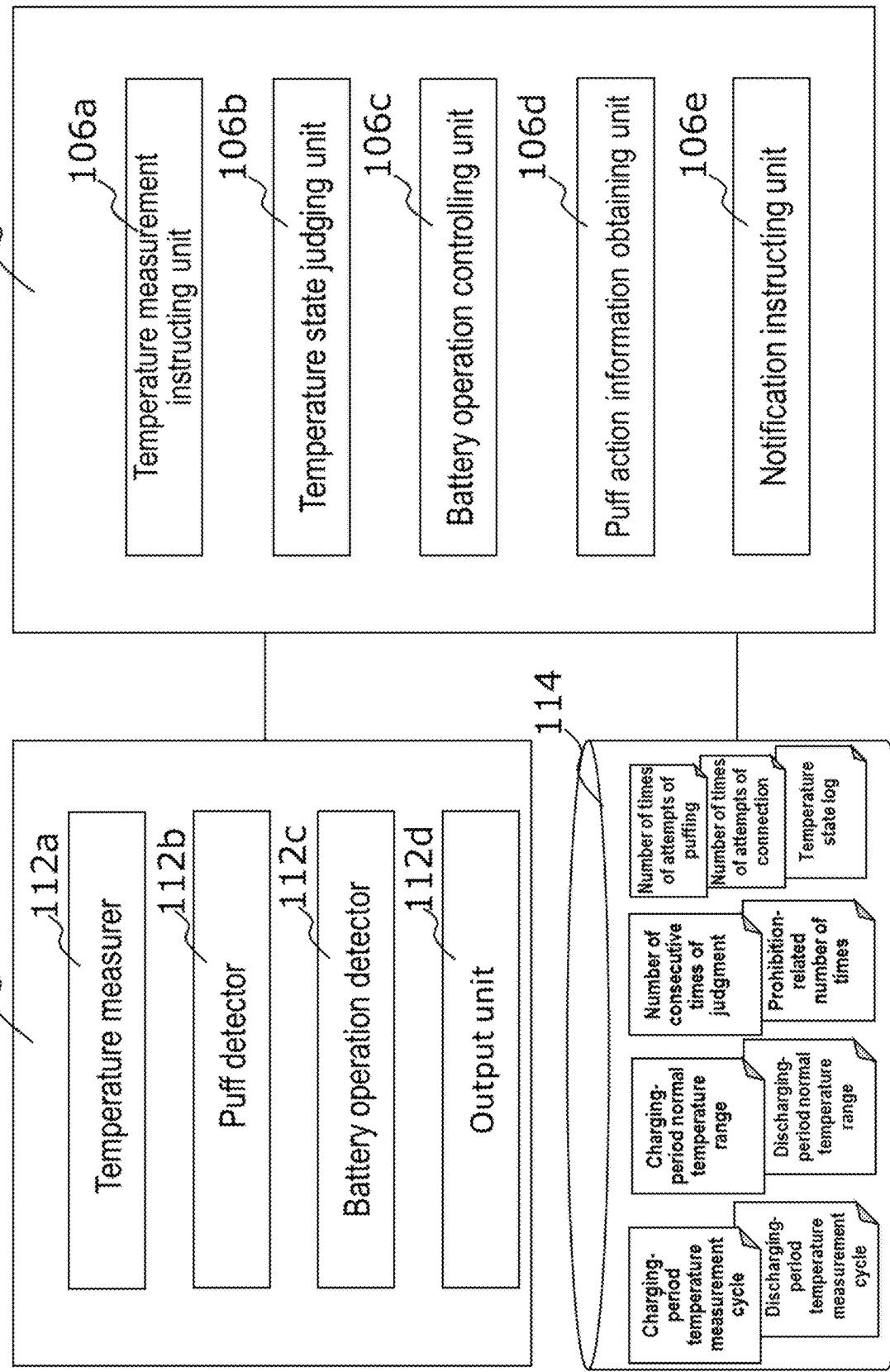
FIG. 2 is a schematic block diagram functionally implemented in a power supply unit according to an embodiment.

FIG. 2 relates to the power supply unit 102 installed in the inhaler device 100 according to an embodiment, and shows examples of main functional blocks implemented by the controller 106 and the sensor 112, and an example of main information stored in the memory 114. The controller 106 controls, by working with the sensor 112 and the memory 114, various kinds of operation relating to charging operation and discharging operation of the battery. Examples of functional blocks in the controller 106 include a temperature measurement instructing unit 106a, a temperature state judging unit 106b, a battery operation controlling unit 106c, a puff action information obtaining unit 106d, and a notification instructing unit 106e. Examples of functional blocks in the sensor 112 include a temperature measurer 112a, a puff detector 112b, a battery operation detector 112c, and an output unit 112d. Examples of pieces of information stored in the memory 114 include a charging-period temperature measurement cycle, a discharging-period temperature measurement cycle, a charging-period normal temperature range, a discharging-period normal temperature range, the number of consecutive times of judgment, the prohibition-related number of times, the number of times of attempts of puffing, the number of times of attempts of connection, and a temperature state log.

Regarding the functional blocks in the controller 106, the temperature measurement instructing unit 106a makes the sensor 112 measure the temperature of the sensor 112. In more detail, the temperature measurement instructing unit 106a instructs the temperature measurer 112a in the sensor to measure the temperature of the sensor 112, in accordance with a charging-period temperature measurement cycle when the battery 110 is performing charging operation, and in accordance with a discharging-period temperature measurement cycle when the battery 110 is performing discharge operation. The temperature state judging unit 106b judges, based on measurement result received from the output unit 112d, respective temperature states of the power supply unit 102 (or the controller 106) when the battery 110 is performing charging operation or the battery 110 is performing discharging operation.

The battery operation controlling unit 106c obtains an operation state of the battery 110 via the output unit 112d, and makes the battery 110 start, restart, stop, or inhibit charging operation or discharging operation. In an example, if it is judged that the temperature state of the power supply unit 102 represents temperature abnormality, operation control applied to the battery 110, such as control to stop charging operation or discharging operation, control to permanently inhibit charging operation or discharging operation if a predetermined condition is satisfied, or the like, is performed. The puff action information obtaining unit 106d counts the number of times of attempts of puffing, when a puff action performed by a user is detected by the sensor 112. The notification instructing unit 106e instructs the notifier 108 to perform notifying operation, for example, when the power supply unit 102 is in a temperature abnormality state.

Regarding the functional blocks in the sensor 112, the temperature measurer 112a measures the temperature of the controller 106 by using, for example, a temperature sensor, in response to an instruction from the temperature measurement instructing unit 106a. The puff detector 112b detects a puff action performed by a user by using, for example, a pressure sensor or a flow rate sensor. The battery operation detector 112c monitors an electric power state of the battery 110, and detects an operation state such as a state that the battery 110 is performing operation of charging from an external electric power source, a state that the battery 110 is performing operation of discharging (supplying of electric power) to the atomization unit 118 in response to a puff action performed by a user, or the like. The output unit 112d outputs various types of information sensed or detected by the sensor 112 to the controller 106, or stores the information in the memory 114.

Regarding the information stored in the memory 114, the charging-period temperature measurement cycle is a predetermined measurement cycle that is used for measuring the temperature of the controller 106 during a period when charging operation is being performed in the battery 110. Similarly, the discharging-period temperature measurement cycle is a predetermined measurement cycle that is used for measuring the temperature of the controller 106 during a period when discharging operation is being performed in the battery 110. The charging-period normal temperature range is a predetermined temperature range used for judging whether the temperature state of the power supply unit 102 corresponds to temperature abnormality, during a period when charging operation is being performed in the battery 110. Similarly, the discharging-period normal temperature range is a predetermined temperature range used for judging whether the temperature state of the power supply unit 102 corresponds to temperature abnormality, during a period when discharging operation is being performed in the battery 110.

The number of consecutive times of judgment is a predetermined number of times of judgment, and is used for judging that the power supply unit 102 is in a temperature abnormality state. The prohibition-related number of times is a predetermined number of times of attempts of puff actions, and is used for permanently prohibiting discharging operation in the battery 110 in a temperature abnormality state. Also, probably, the prohibition-related number of times is a predetermined number of times of attempts of connection to an external electric power source, and is used for permanently prohibiting discharging operation in the battery 110 in a temperature abnormality state.

The number of times of attempts of puffing is the number of times of attempts corresponding to detected puff actions of a user in a puff action series, when discharging operation of the battery 110 is being stopped. In this regard, the puff action series refers to a series of actions wherein a predetermined number of times (for example, eight times) of puff actions are repeatedly performed. The number of times of attempts of connection is the number of times of attempts of connection to an external electric power source from the power supply unit 102, when charging operation of the battery 110 is being stopped. The temperature state log is history information of the temperature state of the power supply unit 102 judged by the controller 106.

Figure 3:
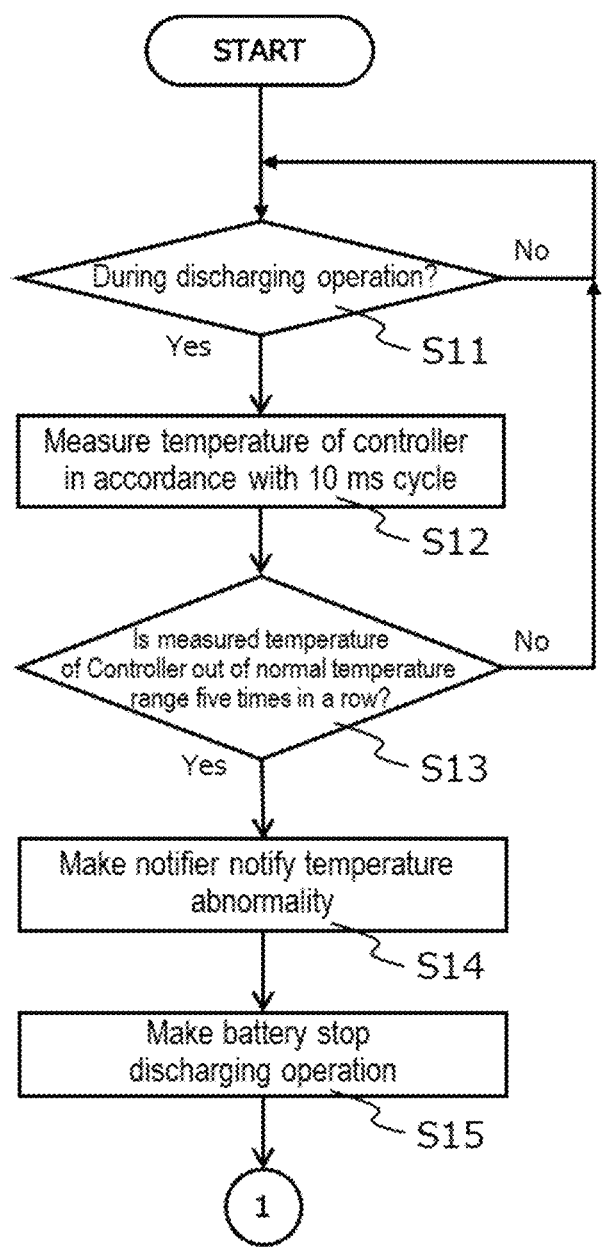
FIG. 3 is a flow chart showing an example of operation of a power supply unit according to an embodiment.
Figure 4:
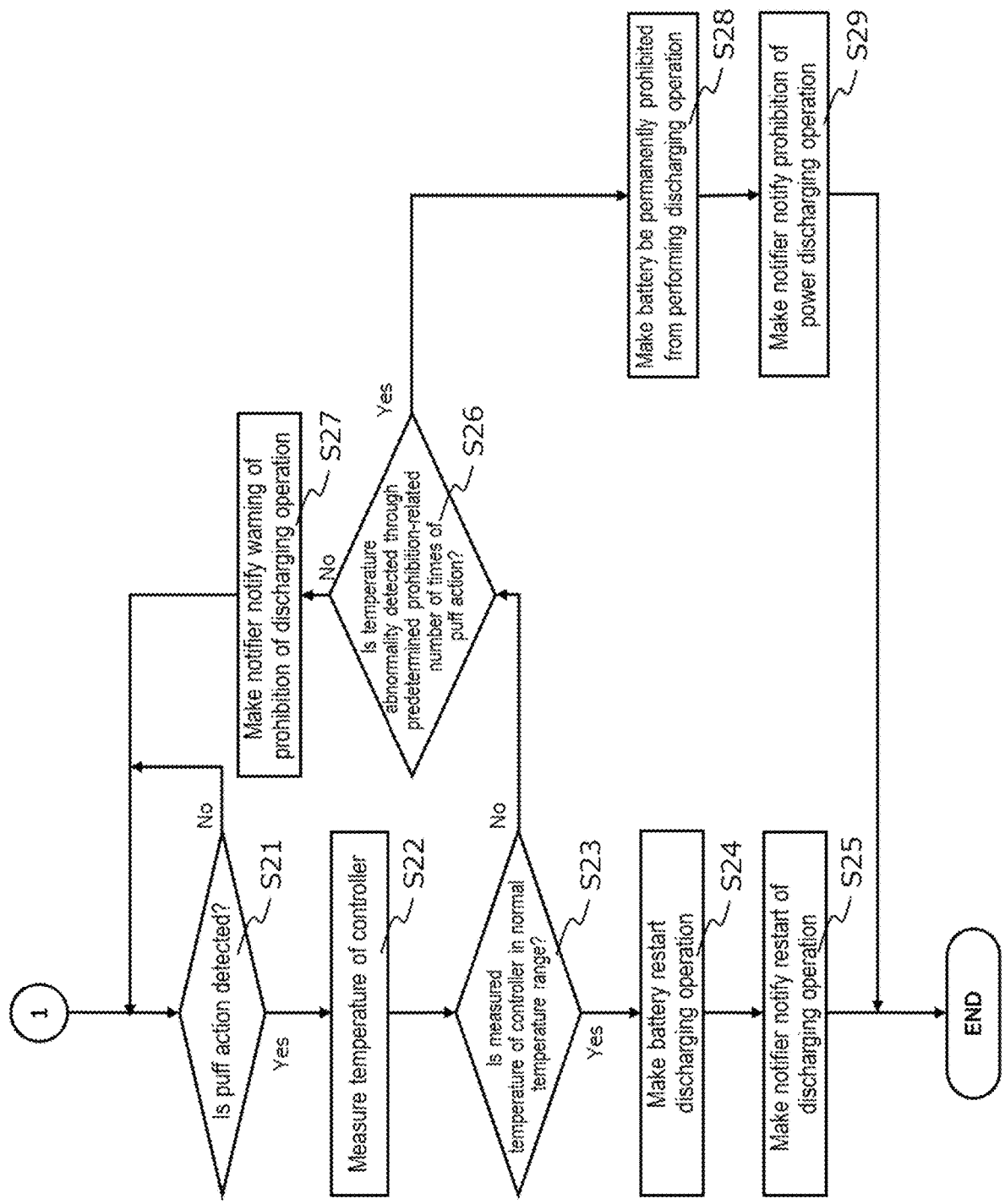
FIG. 4 is a flow chart showing an example of operation of the power supply unit according to the embodiment.
Figure 5:
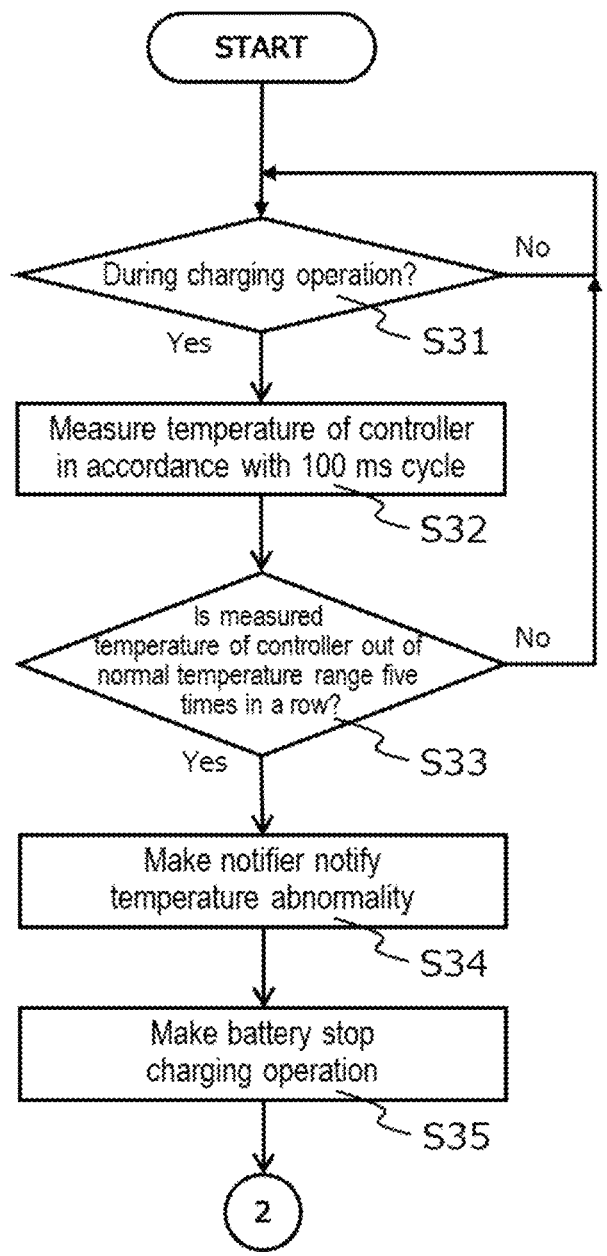
FIG. 5 is a flow chart showing an example of operation of a power supply unit according to an embodiment.
Figure 6:
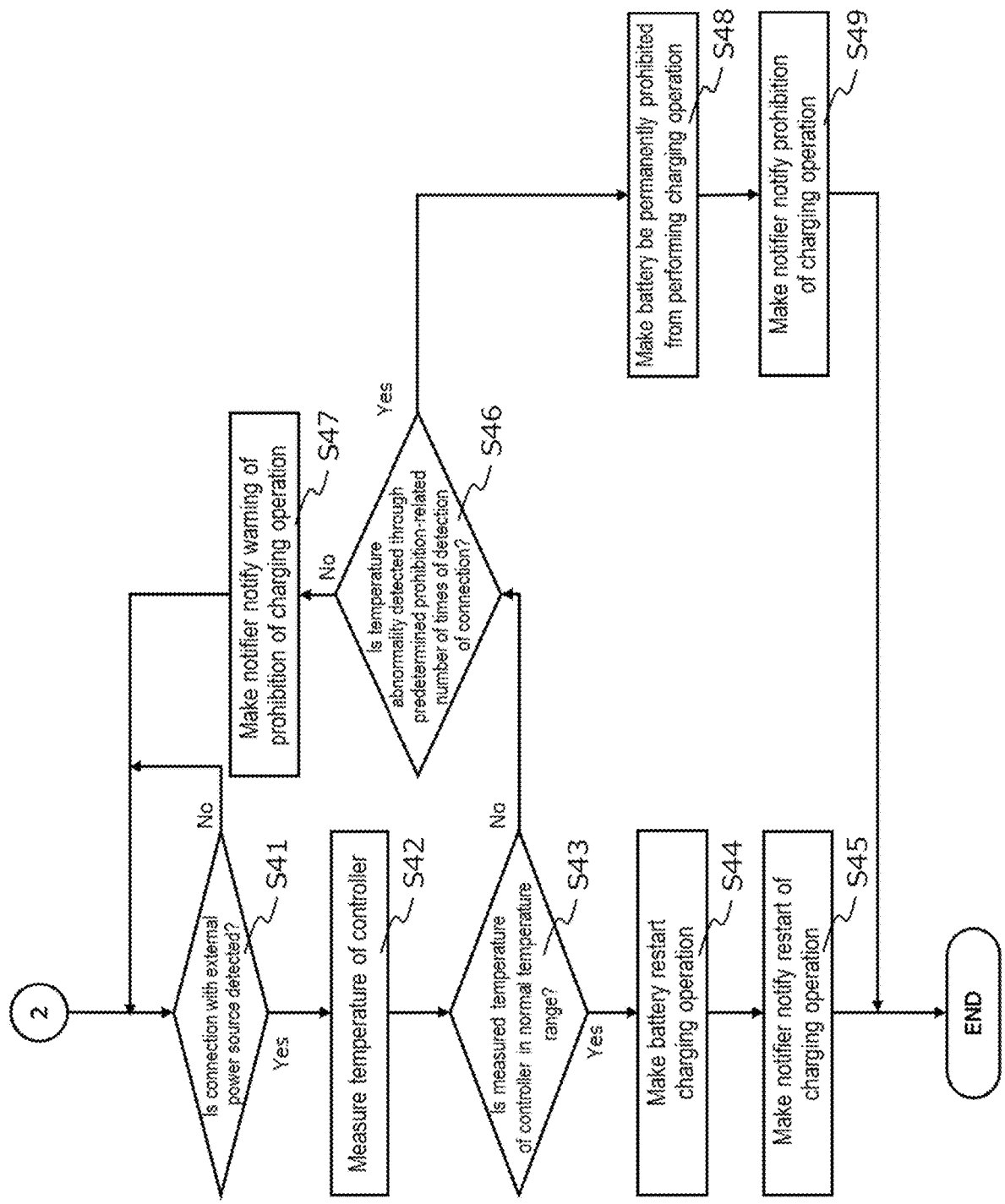
FIG. 6 is a flow chart showing an example of operation of the power supply unit according to the embodiment.

FIGS. 3-6 are examples of flow charts of control performed by the controller 106 for controlling operation of the batter 110, based on the temperature state of the power supply unit 102 installed in the inhaler device 100, according to an embodiment. FIGS. 3 and 4 in the above figures show examples of control operation when the battery 110 is in a discharging state. More specifically, FIG. 3 shows an example of control operation for stopping discharging operation when the temperature state of the power supply unit 102 corresponds to temperature abnormality, during the time when the battery 110 is performing discharging operation; and FIG. 4 shows an example of control operation for restarting discharging operation that is stopped in FIG. 3. On the other hand, FIGS. 5 and 6 show examples of control operation when the battery 110 is in a charging state. More specifically, FIG. 5 shows an example of control operation for stopping charging operation when the temperature state of the power supply unit 102 corresponds to temperature abnormality, during the time when the battery 110 is performing charging operation; and FIG. 6 shows an example of control operation for restarting charging operation that is stopped. in FIG. 5.

In this regard, in an embodiment, the state that the battery 110 is in a discharge state or is performing discharge operation represents a state that the power supply unit 102 is being connected to the cartridge 104 via a port and the battery 110 is supplying electric power to the atomization unit 118. For example, the state during the time when a user is performing a puff action series is that wherein an aerosol source is being atomized as a result of heating of the heater in the atomization unit 118 through discharging operation of the battery 110 and the inhaler device 100 is generating aerosol. On the other hand, the state during the time when the battery 110 is in a charging state or is performing charging operation is that wherein the power supply unit 102 is being connected to an external electric power source (for example, a charger) via a port and the battery 110 is being charged by receiving supply of electric power from the external electric power source.

Control Operation Example 1: Case When Battery 110 is in Discharging State

In FIG. 3, first, in step S11, the controller 106 makes the battery operation detector 112c detect the operation state of the battery 110. For example, during the time when a user is performing puff action, the operation state of the battery 110 is detected as a state wherein discharging operation is being performed. In step S11, in the case that the operation state of the battery 110 is a state wherein discharging operation is being performed (Yes), the temperature measurement instructing unit 106a makes the temperature measurer 112a measure the temperature of the controller 106, in accordance with the discharging-period temperature measurement cycle (for example, 10 ms) in step S12. On the other hand, if it is not detected in step 11 that the operation state of the battery 110 is a state wherein discharging operation is being performed (No), the process does not proceed to the following step.

In response to the result of measurement in step S12, the controller 106 performs a process for judging the temperature state of the power supply unit 102 during the time when the battery 110 is performing discharging operation. Specifically, in step S13, the temperature state judging unit 106b performing judgment as to whether the temperature of the controller 106 measured in step S12 is out of a discharging-period normal temperature range (for example, from −0 degrees Celsius to ±55 degrees Celsius) a predetermined number of consecutive times (for example, five times) of measurement.

As a result of step S13, if the measurement result shows that the temperature of the controller 106 is out of the discharging-period normal temperature range the predetermined number of times of measurement in a row (Yes), the temperature state judging unit 106b judges that the temperature state of the power supply unit 102 corresponds to temperature abnormality. On the other hand, as a result of step S13, if the measurement result shows that the temperature of the controller 106 is not out of the discharging-period normal temperature range and is in the discharging-period normal temperature range (No), it is judged that the temperature state of the power supply unit 102 corresponds to temperature normality, and the process does not proceed to the following step.

In step S14, in response to the judgment judging that the temperature state of the power supply unit 102 corresponds to temperature abnormality, the notification instructing unit 106e activates the notifier 108 to output notification representing temperature abnormality. For example, it is preferable to provide a user with notification in various forms, by using light emission from an LED, display by a display device, vocalization by a speaker, vibration from a vibrator, and an arbitrary combination of the above actions. Next, in step S15, the battery operation controlling unit 106c makes the battery 110 stop the discharging operation. As a result, supplying of electric power to the heater in the atomization unit 118 is stopped.

In this regard, the order of processes may be reversed in such a manner that notification of temperature abnormality in step S14 may be performed after stopping of the discharging operation in step S15.

As explained above, according to the embodiment, in the case that the temperature of the controller 106 is out of a discharging-period normal temperature range a number of consecutive times, it is judged that the temperature state of the power supply unit 102 corresponds to temperature abnormality, and discharging operation of the battery 110 can be stopped. When performing judgment with respect to temperature abnormality, accuracy of judgment of temperature abnormality can be improved by adopting the system to detect the temperature of the controller 106 a number of consecutive times. More specifically, regarding measurement of temperature of the controller 106, for example, there may be a case wherein it is judged as a result of misjudgment that the temperature of the controller 106 is out of the discharging-period normal temperature range, although the temperature is actually in the discharging-period normal temperature range, due to a noise generated in a sensor. Accordingly, it becomes possible to decrease, as much as possible, the possibility of occurrence of misjudgment such as that explained above, by performing judgment a plural number of times in a row.

In this regard, it is preferable that the number of consecutive times counted herein be stored in the memory 114 as part of a temperature state log, and temperature abnormality be judged while the count is compared with the number of consecutive times of judgment that is also stored in the memory 114. Further, although it is preferable to set the number of consecutive times of judgment, for example, to five, the number is not limited thereto.

Further, according to an embodiment, if it is judged that the controller 106 is in a temperature abnormality state, the discharging operation of the battery 110 is immediately stopped, so that it is possible to flexibly treat temperature abnormality occurred in the controller 106. Especially, it is possible to prevent failure of the power supply unit 102. Further, by preventing failure of the power supply unit 102, failure of the whole inhaler device 100 can be prevented. As a result, it becomes possible to prevent the state of each of respective parts included in the power supply unit 102 or the inhaler device 100 and/or the whole inhaler device 100 from progressing to a state wherein repairing thereof is impossible, and extend the life thereof.

In a middle point of a puff action series performed by a user, if the discharging operation of the battery 110 is stopped in step S15 in FIG. 3, the process proceeds to the processing flow in FIG. 4. In FIG. 4, it is supposed that the controller 106 is in a temperature abnormality state, and control operation for restarting the stopped discharging operation of the battery 110 is performed. First, in step S21, the puff action information obtaining unit 106*d* makes the puff detector 112*b* again detect puff action of a user, after stopping of the discharging operation of the battery 110. If a puff action is again detected in step S21 (Yes), the controller 1106 performs, in steps S22-S25, control operation for restarting the stopped discharging operation of the battery 110. On the other hand, if a puff action is not detected again in step S21 (No), the process does not proceed to the following step.

In step S22, the temperature measurement instructing unit 106*a* makes the temperature measurer 112*a* measure the temperature of the controller 106. Next, in step S23, the temperature state judging unit 106*b* performs judgment as to whether the measured temperature of the controller 106 is in the discharging-period normal temperature range. In step S23, if it is judged that the temperature of the controller 106 is in the discharging-period normal temperature range (Yes), the battery operation controlling unit 106*c* makes, in step S24, the battery 110 restart the discharging operation that has been stopped.

Further, in step S25, the notification instructing unit 106*e* makes the notifier 108 output notification with respect to restart of the discharging operation. As a result, the power supply unit 102 can return to the normal discharging operation. Thereafter, during the time when a puff action series is performed by a user, an aerosol source is atomized as a result of heating of the heater in the atomization unit 118 through discharging operation of the battery 110, so that the inhaler device 100 can be brought to a state to generate aerosol again.

On the other hand, if it is judged in step S23 that the temperature of the controller 106 is not in the discharging-period normal temperature range and is still in a temperature abnormality state (No), the process proceeds to step S26. In step S26, the temperature state judging unit 106*b* further performs judgment with respect to temperature abnormality, through a predetermined prohibition-related number of times (for example, three times) of puff actions. Specifically, the number of times of attempts of puff action detected in step S21, in the state that the discharging operation of the battery 110 is being stopped, is counted, and judgment as to whether the number of times of attempts has reached the prohibition-related number of times is performed.

In this regard, it is preferable that the counted number of times be stored in the memory 114 as the number of times of attempts of puffing, and judgment be performed while the count is compared with the prohibition-related number of times that is also stored in the memory 114.

If it is judged in step S26 that the number of times of attempts of puffing has not yet reached the prohibition-related number of times (No), the notification instructing unit 106*e* makes the notifier 108 output a warning informing that the discharging operation will be permanently prohibited after this, in step S27. Next, the present processing flow returns to step S21 for waiting for an event that a puff action is again detected. On the other hand, if it is judged in step S26 that the number of times of attempts of puffing has reached the prohibition-related number of times (Yes), the battery operation controlling unit 106*c* permanently prohibits the battery 110 from performing discharging operation, in step S28.

Further, in step S29, the notification instructing unit 106*e* makes the notifier 108 output notification informing permanent prohibition of discharging operation. As a result, the battery 110 is permanently disallowed, forcibly, to return to discharging operation. In an example, the power supply unit 102 cannot function, as long as the battery 110 is not replaced by a new one. Also, probably, since the power supply unit 102 is no longer usable, a user must change the whole power supply unit 102 to a new one.

In the notification processes in steps S25, S27, and S29, it is preferable to provide a user with notification in various forms by using, for example, light emission from an LED, display by a display device, vocalization by a speaker, vibration from a vibrator, and an arbitrary combination of the above actions. For example, in step S25, it is preferable to output notification relating to the notification in step S14 in FIG. 3. In an example, in the case that an LED is activated to emit light therefrom when the discharging operation of the battery 110 is stopped in step S14, it is preferable to stop the light emission when the discharging operation of the battery 110 is restarted in step S25.

Further, in step S27, the form of notification may be changed as the number of times of attempts of puff action in a temperature abnormality state approaches the prohibition-related number of times. Specifically, it is preferable to provide a user with notification in a mode wherein electric power consumed for notification becomes larger as the number of times of attempts of puff action increases. In an example, it is preferable to emit light from an LED at the time of a first attempt, output sound from a speaker in addition to the light emission in a second attempt, and generate vibration by a vibrator in addition to the light emission and the sound output in a third attempt. As a result, it becomes possible to make a user have more presence with respect to the state wherein restarting of discharging operation of the battery 110 is prohibited and returning is disallowed, as the number of times of attempts of puff action approaches the prohibition-related number of times.

Further, in step S29, it is preferable to provide a user with notification, that represents the state that the discharging operation of the battery 110 is permanently prohibited and the battery 110 is no longer usable, in a mode that can be recognized by the user. In an example, it is preferable to operate an LED to emit red light to inform prohibition of use and to make the emission easier to be seen by a user. If safety with respect to a user when the user uses the inhaled device 100 is taken into consideration, it is preferable to adopt a notification mode such as that explained above, when the power supply unit 102 is in a temperature abnormality state.

In this regard, the order of processes may be reversed in such a manner that the notification process in step S25 may be performed before restarting of the discharging operation of the battery 110 in step S24. Similarly, the order of processes may be reversed in such a manner that the notification process in step S29 may be performed before the prohibition operation of the battery 110 in step S28.

As explained above, according to an embodiment, discharging operation of the battery 110, that has been stopped due to temperature abnormality in the controller 106, can be restarted by using, as a trigger, an event that a user again attempts puff action when the temperature is in a discharging-period normal temperature range after stopping of the discharging operation. The above matter is based on knowledge that it can be assumed that there may be a case wherein judgment to judge that the controller 106 is in a temperature abnormality state is made due to an external factor that does not arise from abnormality in the controller 106, the unit 102, or the inhaler device 100. The external factor in this case is, for example, a state that a user has left the power supply unit 102 or the inhaler device 100 in a high-temperature environment (for example, in a vehicle, a position close to an air conditioner or a stove, or the like). Temperature abnormality due to an external factor does not relate to temperature abnormality due to a problem in the inside of the power supply unit 102. That is, when existence of a situation such as that explained above is taken into consideration, it is preferable to restart discharging operation of the battery 110 in the case that it is confirmed that the power supply unit 102 or the inhaler device 100 is in an environment having no temperature problem, even in the case that the discharging operation of the battery 110 has been stopped. As a result, user-friendliness of the power supply unit 102 and the inhaler device 100 can be improved.

Control Operation Example 2: Case When Battery 110 is in Charging State

In FIG. 5, first, in step S31, the controller 106 makes the battery operation controlling unit 106c detect the operation state of the battery 110. For example, when the power supply unit 102 is being connected to an external electric power source (for example a charger), the operation state of the battery 110 is detected as that wherein charging is being performed. If, in step S31, the operation state of the battery 110 is a charging-is-being-performed state (Yes), the temperature measurement instructing unit 106a makes the temperature measurer 112a measure temperature of the controller 106 in accordance with a charging-period temperature measurement cycle (for example, 100 ms) in step S32. On the other hand, if it is not detected in step S31 that the operation state of the battery 110 is a charging-is-being-performed state (No), the process does not proceed to the following step.

In response to a result of measurement in step S32, the controller 106 performs a process for judging the state of temperature of the power supply unit 102 when the battery 110 is performing charging operation. Specifically, in step S33, the temperature state judging unit 106b performing judgment as to whether the temperature of the controller 106 measured in step S32 is out of a charging-period normal temperature range (for example, from 0 degree Celsius to +40 degrees Celsius) a predetermined number of consecutive times (for example, five times) of measurement.

As a result of step S33, if the measurement result shows that the temperature of the controller 106 is out of the charging-period normal temperature range the predetermined number of times of measurement in a row (Yes), the temperature state judging unit 106b judges that the temperature state of the power supply unit 102 corresponds to temperature abnormality. On the other hand, as a result of step S33, if the measurement result shows that the temperature of the controller 106 is not out of the charging-period normal temperature range and is in the charging-period normal temperature range (No), it is judged that the temperature state of the power supply unit 102 corresponds to temperature normality, and the process does not proceed to the following step.

In step S34, in response to the judgment judging that the temperature state of the power supply unit 102 corresponds to temperature abnormality, the notification instructing unit 106e activates the notifier 108 to output notification representing temperature abnormality. For example, it is preferable to provide a user with notification in various forms, by using light emission from an LED, display by a display device, vocalization by a speaker, vibration from a vibrator, and an arbitrary combination of the above actions. Next, in step S35, the battery operation controlling unit 106c makes the battery 110 stop the charging operation.

In this regard, the order of processes may be reversed in such a manner that notification of temperature abnormality in step S34 may be performed after stopping of the charging operation in step S35.

As explained above, according to the embodiment, in the case that the temperature of the controller 106 is out of a charging-period normal temperature range a number of consecutive times, it is judged that the temperature state of the power supply unit 102 corresponds to temperature abnormality, and charging operation of the battery 110 can be stopped. When performing judgment with respect to temperature abnormality, accuracy of judgment of temperature abnormality can be improved by adopting the system to detect the temperature of the controller 106 a number of consecutive times. More specifically, regarding measurement of temperature of the controller 106, for example, there may be a case wherein it is judged as a result of misjudgment that the temperature of the controller 106 is out of the charging-period normal temperature range, although the temperature is actually in the charging-period normal temperature range, due to a noise generated in a sensor. Accordingly, it becomes possible to decrease, as much as possible, the possibility of occurrence of misjudgment such as that explained above, by performing judgment a plural number of times in a row.

In this regard, it is preferable that the number of consecutive times counted herein be stored in the memory 114 as part of a temperature state log, and temperature abnormality be judged while the count is compared with the number of consecutive times of judgment that is also stored in the memory 114. Further, although it is preferable to set the number of consecutive times of judgment, for example, to five, the number is not limited thereto.

Further, according to an embodiment, if it is judged that the controller 106 is in a temperature abnormality state, the charging operation of the battery 110 is immediately stopped, so that it is possible to flexibly treat temperature abnormality occurred in the controller 106. Especially, it is possible to prevent failure of the power supply unit 102. As a result, it becomes possible to prevent the state of each of respective parts included in the power supply unit 102 from progressing to a state wherein repairing thereof is impossible, and extend the life thereof.

If the charging operation of the battery 110 is stopped in step S35 in FIG. 5, the process proceeds to the processing flow in FIG. 6. In FIG. 6, it is supposed that the controller 106 is in a temperature abnormality state, and control operation for restarting the stopped charging operation of the battery 110 is performed. First, in step S41, the battery operation controlling unit 106c makes the battery operation detector 112c detect reconnection of the power supply unit 102 to an external electric power source. If reconnection to an external electric power source is detected in step S41 (Yes), the controller performs, in steps S42-S45, control operation for restarting the stopped charging operation of the battery 110. On the other hand, if reconnection to an external electric power source is not detected in step S41 (No), the process does not proceed to the following step.

In step S42, the temperature measurement instructing unit 106a makes the temperature measurer 112a measure the temperature of the controller 106. Next, in step S43, the temperature state judging unit 106b performs judgment as to whether the measured temperature of the controller 106 is in the charging-period normal temperature range. In step S43, if it is judged that the temperature of the controller 106 is in the charging-period normal temperature range (Yes), the battery operation controlling unit 106c makes, in step S44, the battery 110 restart the charging operation that has been stopped.

Further, in step S45, the notification instructing unit 106e makes the notifier 108 output notification with respect to restart of the charging operation. As a result, the power supply unit 102 can return to the normal charging operation, if it is in the state that it is being connected to the external electric power source.

On the other hand, if it is judged in step S43 that the temperature of the controller 106 is not in the charging-period normal temperature range and is still in a temperature abnormality state (No), the process proceeds to step S46. In step S46, the temperature state judging unit 106b further performs judgment with respect to temperature abnormality, through a predetermined prohibition-related number of times (for example, three times) of connecting actions. Specifically, the number of times of attempts of connection to the external electric power source detected in step S41, in the state that the charging operation of the battery 110 is being stopped, is counted, and judgment as to whether the number of times of attempts has reached the prohibition-related number of times is performed.

In this regard, it is preferable that the counted number of times of attempts be stored in the memory 114 as the number of times of connection, and judgment be performed while the count is compared with the prohibition-related number of times that is also stored in the memory 114.

If it is judged in step S46 that the number of times of attempts of connection to the external electric power source has not yet reached the prohibition-related number of times (No), the notification instructing unit 106e makes the notifier 108 output a warning informing that the charging operation will be permanently prohibited after this, in step S47. Next, the present processing flow returns to step S41 for waiting for an event that a re-attempt of connection to an external electric power source is detected. On the other hand, if it is judged in step S46 that the number of times of attempts of connection to the external electric power source has reached the prohibition-related number of times (Yes), the battery operation controlling unit 106c permanently prohibits the battery 110 from performing charging operation, in step S48.

Further, in step S49, the notification instructing unit 106e makes the notifier 108 output notification informing permanent prohibition of charging operation. As a result, the battery 110 is permanently disallowed, forcibly, to return to a charging operation state. In an example, the power supply unit 102 cannot function, as long as the battery 110 is not replaced by a new one. Also, probably, since the power supply unit 102 is no longer usable, a user must change the whole power supply unit 102 to a new one.

In the notification processes in steps S45, S47, and S49, it is preferable to provide a user with notification in various forms by using, for example, light emission from an LED, display by a display device, vocalization by a speaker, vibration from a vibrator, and an arbitrary combination of the above actions. For example, in step S45, it is preferable to output notification relating to the notification in step S34 in FIG. 5. In an example, in the case that an LED is activated to emit light therefrom when the charging operation of the battery 110 is stopped in step S34, it is preferable to stop the light emission when the charging operation of the battery 110 is restarted in step S45.

Further, in step S47, the form of notification may be changed as the number of times of attempts of connection to the external electric power source in a temperature abnormality state approaches the prohibition-related number of times. Specifically, it is preferable to provide a user with notification in a mode wherein electric power consumed for notification becomes larger as the number of times of attempts of connection increases. In an example, it is preferable to emit light from an LED at the time of temperature abnormality detection in a first attempt, output sound from a speaker in addition to the light emission at the time of temperature abnormality detection in a second attempt, and generate vibration by a vibrator in addition to the light emission and the sound output at the time of temperature abnormality detection in a third attempt. As a result, it becomes possible to make a user have more presence with respect to the state wherein restarting of charging operation of the battery 110 is prohibited and returning is disallowed, as the number of times of attempts of connection approaches the prohibition-related number of times.

Further, in step S49, it is preferable to provide a user with notification, that represents the state that the charging operation of the battery 110 is permanently prohibited and the battery 110 is no longer usable, in a mode that can be recognized by the user. In an example, it is preferable to operate an LED to emit red light to inform prohibition of use and to make the emission easier to be seen by a user. If safety with respect to a user when the user uses the inhaled device 100 is taken into consideration, it is preferable to adopt a notification mode such as that explained above, when the power supply unit 102 is in a temperature abnormality state.

In this regard, the order of processes may be reversed in such a manner that the notification process in step S45 may be performed before restarting of the charging operation of the battery 110 in step S44. Similarly, the order of processes may be reversed in such a manner that the notification process in step S49 may be performed before the prohibition operation of the battery 110 in step S48.

As explained above, according to an embodiment, charging operation of the battery 110, that has been stopped due to temperature abnormality in the controller 106, can be restarted by using, as a trigger, an event that a user again attempts connection to an external electric power source when the temperature is in a charging-period normal temperature range after stopping of the charging operation. The above matter is based on knowledge that it can be assumed that there may be a case wherein judgment to judge that the controller 106 is in a temperature abnormality state is made due to an external factor that does not arise from abnormality in the controller 106. The external factor in this case is, for example, a state that a user has left the power supply unit 102 in a high-temperature environment (for example, in a vehicle, a position close to an air conditioner, or the like). Temperature abnormality due to an external factor does not relate to temperature abnormality due to a problem in the inside of the power supply unit 102. That is, when existence of a situation such as that explained above is taken into consideration, it is preferable to restart charging operation of the battery 110 in the case that it is confirmed that the power supply unit 102 is in an environment having no temperature problem, even in the case that the charging operation of the battery 110 has been stopped. As a result, user-friendliness of the power supply unit 102 can be improved.

Information Used in Control Operation Examples 1 and 2

As explained above, according to the embodiment, various kinds of predetermined set values are stored in the memory 114. The set values are used for operation control in the control operation examples 1 and 2. The set value comprises a charging-period temperature measurement cycle and a discharging-period temperature measurement cycle, and a charging-period normal temperature range and a discharging-period normal temperature range. The charging-period temperature measurement cycle and the charging-period normal temperature range are used for control at the time of charging operation of the battery 110. Also, the discharging-period temperature measurement cycle and the discharging-period normal temperature range are used for control at the time of discharging operation of the battery 110.

Figure 7:
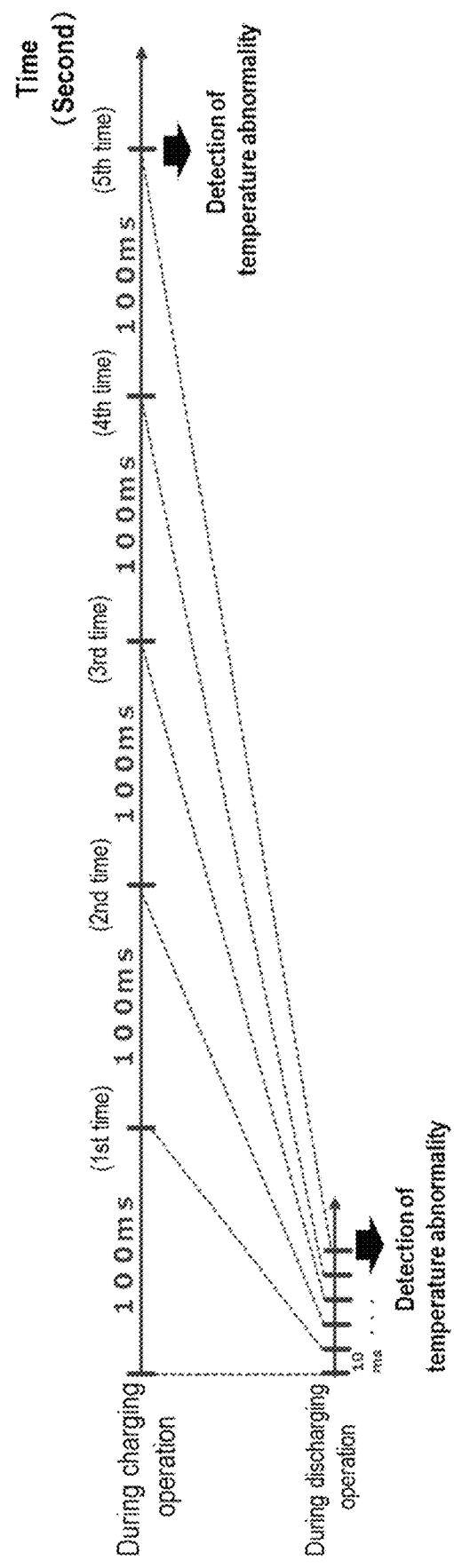
FIG. 7 is a schematic diagram showing relationship between a temperature measurement cycle during charging and a temperature measurement cycle during discharging.

It is preferable that the charging-period temperature measurement cycle be set longer than the discharging-period temperature measurement cycle. For example, as shown in FIG. 7, it is preferable to set the charging-period temperature measurement cycle to 100 ms, and, on the other hand, it is preferable to set the discharging-period temperature measurement cycle to 10 ms. In the above case, in order to obtain a judgment result representing temperature abnormality as a result that the measured temperature of the controller 106 is out of the normal temperature range five times in a row, a total of 500 ms is required when the charging operation is performed and a total of 50 ms is required when the discharging operation is performed.

Regarding the setting that the charging-period temperature measurement cycle is set longer than the discharging-period temperature measurement cycle, the setting is adopted based on knowledge that the possibility that temperature abnormality occurs in the controller 106 during charging operation is low compared with that during discharging operation. More specifically, during discharging operation, the load applied the controller 106 becomes high as a result that large current is applied to the controller 106 for rapidly raising the temperature of the heater included in the atomization unit 118; so that the possibility that temperature abnormality occurs in the controller 106 becomes high. On the other hand, during the charging operation, the load applied to the controller 106 is low compared with that during the discharging operation; so that the possibility that temperature abnormality occurs in the controller 106 is relatively low. That is, it is not necessary to set the cycle used during the charging operation to a cycle that is the same as that required to be used during the discharging operation; and the temperature state of the power supply unit 102 may be monitored by using a cycle longer than that used during the discharging operation. In this regard, the numerical values are not limited to the above explained values. specifically, 10 ms and/or 100 ms.

As explained above, by adopting the construction for monitoring the temperature state of the controller 102 by using a long cycle during charging operation and a short cycle during discharging operation, temperature abnormality occurred in the controller 106 can be treated flexibly. Further, by setting the cycle of temperature measurement during charging operation longer than that during discharging operation to thereby avoid performing of excessive number of times of temperature measurement, maintaining of battery performance and extending of battery life can be realized, and, at the same time, occurrence of temperature abnormality can be quickly detected.

Figure 8:
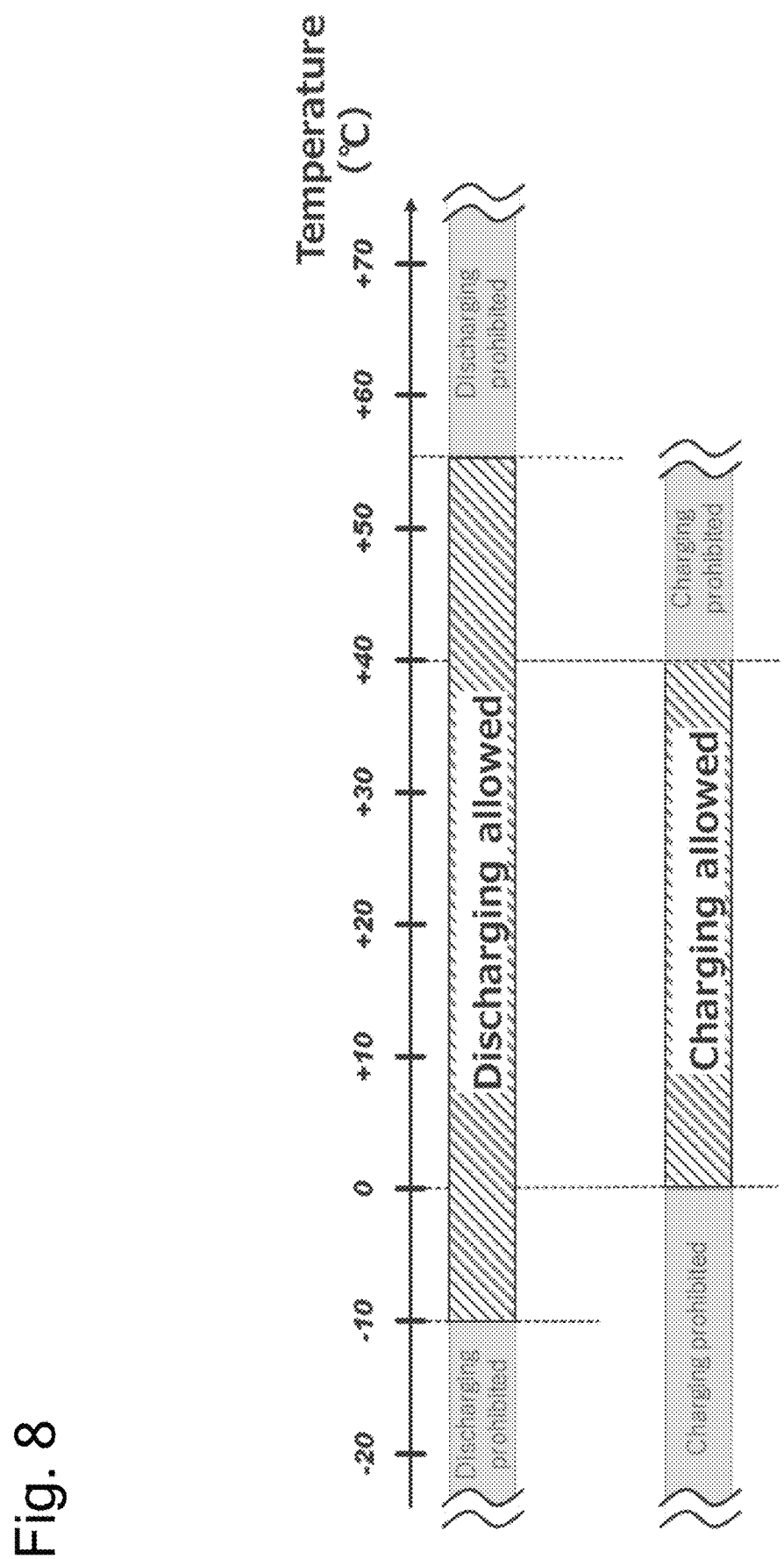
FIG. 8 is a schematic diagram showing relationship between a normal temperature range during charging and a normal temperature range during discharging.

Further, it is preferable to set the charging-period normal temperature range to be different from the discharging-period normal temperature range. Especially, a risk that a battery failure occurs in low temperature and high temperature during charging is high compared with that during discharging, so that it is preferable to set the charging-period normal temperature range narrower than the discharging-period normal temperature range. For example, as shown in FIG. 8, it is preferable to set the discharging-period normal temperature range to a range from −10 degrees Celsius to +55 degrees Celsius, and on the other hand, it is preferable to set the charging-period normal temperature range to a range from 0 degree Celsius to +40 degrees Celsius.

In the above-explained embodiment example, the construction, wherein charging operation is allowed to be performed when the temperature of the battery is in the range from 0 degree Celsius to +40 degrees Celsius and discharging operation is allowed to be performed when the temperature of the battery is in the range from −10 degree Celsius to +55 degrees Celsius, is adopted. Compared with the case of the charging operation, the possibility of occurrence of a battery failure is low and the risk relating thereto is small in the discharging operation, thus, in the above explained embodiment example, the temperature range that allows performing of discharging operation is set to a range wider than the temperature range that allows performing of charging operation. However, the above numerical value ranges are mere examples, and other numerical value ranges may be used.

As explained above, by adopting the construction for setting the discharging-period normal temperature range wider than the charging-period normal temperature range and monitoring the temperature state of the controller 102, temperature abnormality occurred in the controller 106 can be treated flexibly. Further, the construction, wherein excessive widening of the charging-period normal temperature range is avoided, contributes to maintaining of battery performance and extending of battery life.

<Modification Example of Power Supply Unit According to Embodiment>

In the above explanation of the embodiment, as an example of the temperature measurer 112a for measuring temperature of the controller 106, a temperature sensor included in the power supply unit 102 is adopted. If a temperature sensor is physically installed in a position close to or in the inside of the controller 106, the temperature measurer 112a can easily measure the temperature of the controller 106 based on an output value of the temperature sensor. Further, the measured temperature of the controller 106 is outputted by the output unit 112*d* and obtained by the controller 106.

However, it is not necessarily required to use the temperature sensor for measurement of temperature of the controller 106 by the temperature measurer 112*a*. For example, instead of using a temperature sensor, a diode included in the controller 106 can be used for measuring the temperature of the controller 106. Also, probably, by providing the power supply unit 102 with a PTC (Positive Temperature Coefficient) thermistor, it may become possible to measure the temperature of the controller 106.

Figure 9:
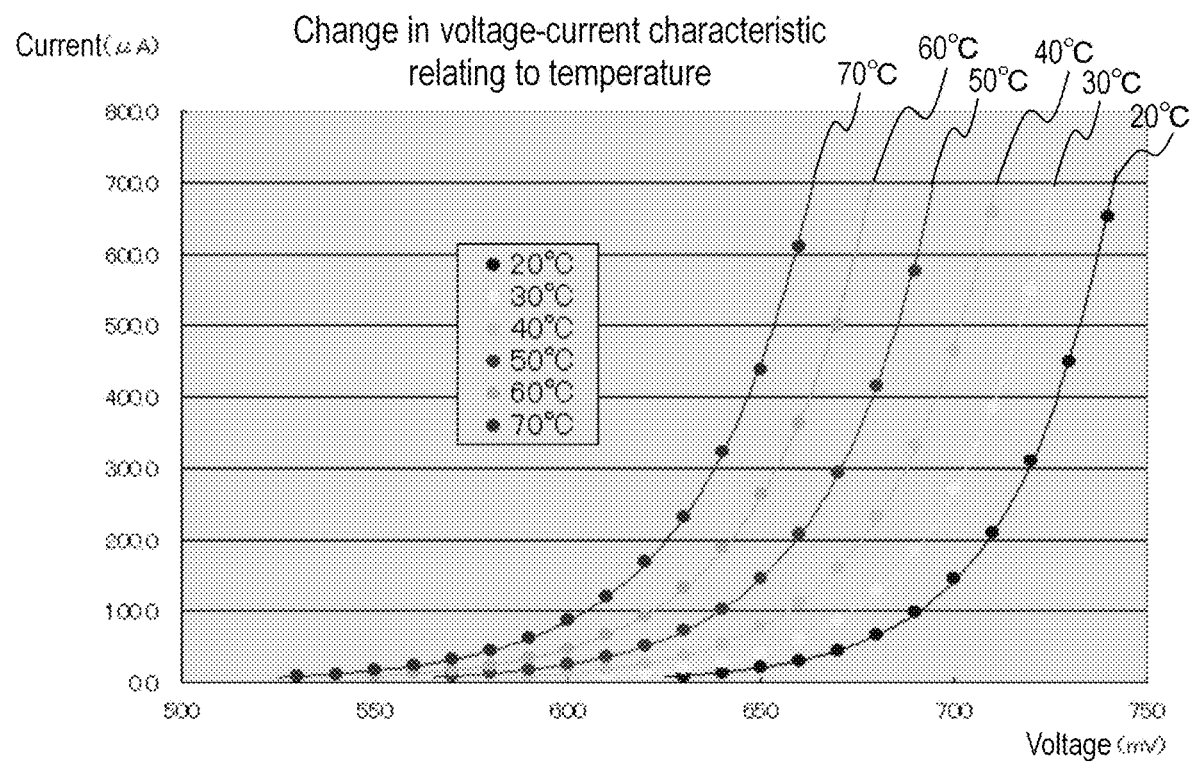
FIG. 9 is a graph of an example showing temperature characteristic of a diode.

In the case that a diode included in a circuit, which is a component of the controller 106 (for example, a CPU (Central Processing Unit)), is used, the power supply unit 102 has to have temperature characteristic information of the diode. FIG. 9 is an example of a graph showing temperature characteristics of a diode. In the graph shown in FIG. 9, the horizontal axis represents voltages (mV) and the vertical axis represents current (microampere), and lines showing characteristics when the temperature of the diode is 20-70 degrees Celsius, specifically, a single line for every 10 degrees Celsius, are shown. The temperature measurer 112*a* can specify the temperature of the diode, by measuring a voltage value and a current value of the diode by use of the sensor and referring to the temperature characteristic information of the diode.

In this regard, for example, the temperature characteristic information of the diode may be stored, in the memory 114, in the form of a table, in the form of a mathematical function in which the voltage value and the current value are used as variables, or in an arbitrary form other than the above forms.

Figure 10:
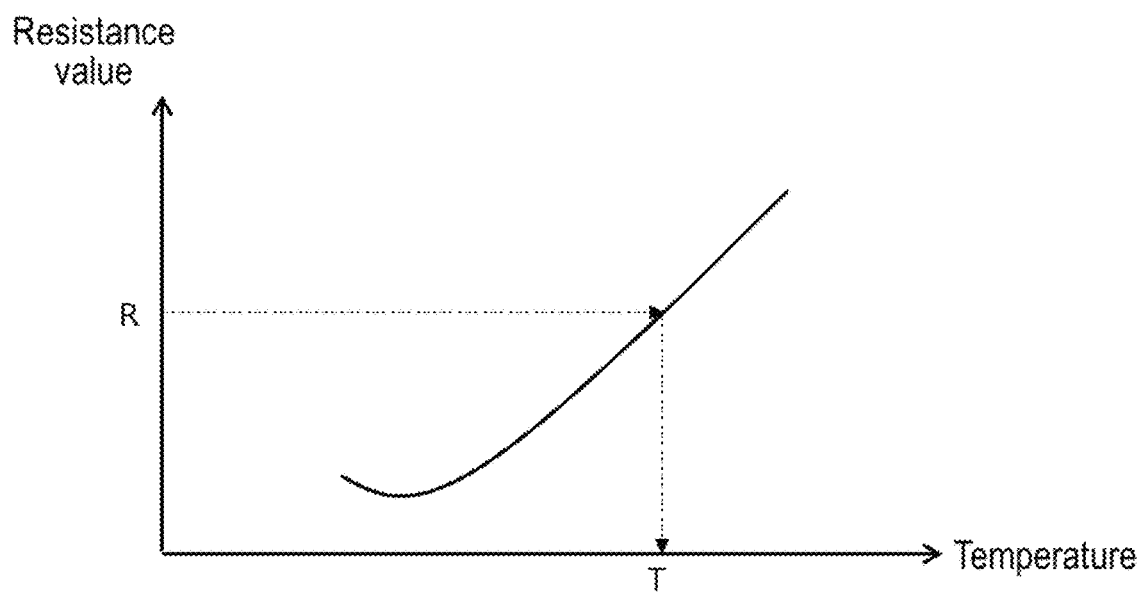
FIG. 10 is a graph of an example showing temperature characteristic of a PTC thermistor.

In the case that the power supply unit 102 is provided with a PTC thermistor, it is necessary to have temperature characteristic information of the PTC thermistor. FIG. 10 is an example of a graph showing a temperature characteristic of a PTC thermistor. In the graph shown in FIG. 10, the horizontal axis represents temperature (degrees Celsius) and the vertical axis represents resistance values (ohms). The PTC thermistor is a current limiting element which has a characteristic wherein, when the temperature thereof is raised, the resistance value steeply increases after the temperature exceeds a specific temperature boundary; and it can be used for detection of overheating and protection from overcurrent. More specifically, in the case that a PTC thermistor is installed in a position close to the controller 106 in the power supply unit 102, it is possible to prevent, by the PTC thermistor, flowing of large current even in the case that a short circuit is formed or the like in a circuit in the controller. As a result, it becomes possible to detect and prevent, in advance, serious failure in the power supply unit 102 and/or the inhaler device 100. Further, as shown by the arrows comprising dotted lines in FIG. 10, the temperature measurer 112*a* can specify the temperature of the PTC thermistor, by measuring the resistance value of the PTC thermistor and referring to the temperature characteristic information thereof.

In this regard, for example, the temperature characteristic information of the FTC thermistor may be stored, in the memory 114, in the form of a table, in the form of a mathematical function in which the temperature and the resistance are used as variables, or in an arbitrary form other than the above forms.

<Application to Inhaler Device>

As explained above, the inhaler device 100, to which the power supply unit 102 according to the embodiment is being coupled in an attachable/detachable manner, can measure the temperature of the controller 106 and judge the temperature state of the power supply unit 102. In addition, in the case that the power supply unit 102 according to the embodiment is applied to the inhaler device 100, the inhaler device 100 can infer an abnormality state of the inhaler device 100 itself, based on measurement of the temperature of the controller 106, without measuring the temperature of the heater included in the atomization unit 118.

In this regard, it is preferable that the inhaled device 100 relating to an application embodiment such as that explained above be mainly based on the construction shown in FIG. 1A or 1B. Further, it is preferable that control of the inhaler device 100 according to an application embodiment such as that explained above be realized by using the processing flows during discharging operation of the battery (i.e., during operation for supplying electric power from the battery 110 to the atomization unit 118) that have been explained in relation to FIGS. 2-4.

The inhaler device 100 according to the application embodiment comprises a power supply unit 102 according to the embodiment and the atomization unit 118 for atomizing or vaporizing an inhaled component source. Further, the power supply unit 102 comprises the battery 110, the controller 106 for controlling supplying of electric power from the battery 110 to the atomization unit 118, and the temperature measurer 112*a* for measuring the temperature of the controller 106.

During operation to supply electric power to the atomization unit 118, the temperature measurement instructing unit 106*a* makes the temperature measurer 112*a* measure temperature of the controller 106 in accordance with a predetermined discharging-period temperature measurement cycle (step S12 in FIG. 3). Thereafter, the temperature state judging unit 106*b* is made to judge, in response to the measurement result, a temperature state of the power supply unit 102 (or the controller 106), and infer, in response to the temperature state, a temperature state of the inhaler device 100. That is, in the inhaler device 100 according to the application embodiment, the temperature state judging unit 106*b* performs, during operation to supply electric power from the battery 110 to the atomization unit 118, inferring of the temperature state of the inhaler device 100 itself, in addition to judging of the temperature state of the power supply unit 102. In an example, in the case that it is judged that the temperature state of the power supply unit 102, during operation to supply electric power from the battery 110 to the atomization unit 118, corresponds to temperature abnormality, it is preferable to inter that the inhaler device 100 itself is also in a temperature abnormality state, or a state just before the temperature abnormality state.

In more detail, in the inhaler device 100 according to the application embodiment, the temperature state judging unit 106*b* performs judgment as to whether the temperature of the controller 106, that is measured in accordance with the discharging-period temperature measurement cycle, is out of the normal temperature range a number of times (for example, five times) of measurement in a row. Thereafter, in the case that the measurement result shows that the temperature of the controller 106 is out of the normal temperature range the number of times of measurement in a row, the temperature state judging unit 106*b* judges that the temperature state of the power supply unit 102 corresponds to temperature abnormality. In addition, it is preferable that the temperature state judging unit 106*b* inter that the temperature state of the inhaler device 100 itself also corresponds to temperature abnormality.

In the inhaler device 100 according to the application embodiment, in the case that it is inferred that the temperature state of the inhaler device 100 corresponds to temperature abnormality, it is preferable that, in response thereto, the notification instructing unit 106e makes the notifier 108 be activated and output notification with respect to the temperature abnormality of the inhaler device 100 (step S14 in FIG. 3). For example, it is preferable to provide a user with notification in various forms by using, for example, light emission from an LED, display by a display device, vocalization by a speaker, vibration from a vibrator, and an arbitrary combination of the above actions. In this regard, in the case that it is inferred that the temperature state of the inhaler device 100 corresponds to temperature abnormality, the state of the inhaler device 100 is close to a failure state, and the possibility that it becomes unusable is high; so that it is preferable to provide a user with notification in the form that consumes large electric power. As a result, it becomes possible to make a user perceive the above matter with presence.

Further, in the case that it is judged that the temperature state of the inhaler device 100 corresponds to temperature abnormality, the battery operation controlling unit 106c makes the battery 110 stop discharging operation. As a result, supplying of electric power from the battery 110 to the atomization unit 118 is stopped (step S15 in FIG. 3).

As explained above, according to the application embodiment, in the case that the temperature of the controller 106 is out of the discharging-period normal temperature range a number of times of measurement in a row, it is interred that the temperature state of the inhaler device 100 itself corresponds to temperature abnormality, and the operation of the battery 100 to supply electric power to the atomization unit 118 can be stopped. With respect to judgment of temperature abnormality, accuracy of judgment of temperature abnormality can be improved by adopting the system to detect the temperature of the controller 106 a number of consecutive times. More specifically, regarding measurement of temperature of the controller 106, for example, there may be a case wherein it is judged as a result of misjudgment that the temperature of the controller 106 is out of the discharging-period normal temperature range, although the temperature is actually in the discharging-period normal temperature range, due to a noise generated in the sensor 112. Accordingly, it becomes possible to decrease, as much as possible, the possibility of occurrence of misjudgment such as that explained above, by performing judgment a plural number of times in a row.

Further, according to the application embodiment, in the case that it is inferred that the inhaler device 100 is in a temperature abnormality state, discharging operation of the battery 110 is immediately stopped, so that a bad influence to the inhaled device 100 can be minimized. As a result, it becomes possible to prevent the state of the whole inhaler device 100 from progressing to a state wherein repairing thereof is impossible, and extend the life thereof.

In the above description, operation methods of a power supply unit, which is installed in an inhaler device, according to embodiments and an operation method of an inhaler device according to an application embodiment have been explained with reference to the block diagrams shown in FIGS. 1A-2, the methods shown in FIGS. 3-6, and the setting information shown in FIGS. 7-8. It will be understood that the present disclosure may be implemented as programs for making a processor execute the methods shown in FIGS. 3-6 when the programs are executed by the processor, or a computer-readable storage medium storing the above programs.

In the above description, embodiments of the present disclosure have been explained together with their modification examples and an application embodiment; and, in this regard, it should be understood that they are mere examples, and they are not those limiting the scope of the present disclosure. It should be understood that change, addition, and modification with respect to the embodiments can be performed appropriately, without departing from the gist and the scope of the present disclosure. The scope of the present disclosure should not be limited by any of the above-explained embodiments, and should be limited by the claims and equivalents thereof only.

REFERENCE SIGNS LIST 100A, 100B, 100 . . . Inhaler device: 102 . . . First member (Power supply unit): 104 . . . Second member (Cartridge): 106 . . . Controller: 108 . . . Notifier: 110 . . . Battery: 112 . . . Sensor: 114 . . . Memory: 116 . . . Reservoir: 118 . . . Atomization unit: 120 . . . Air taking-in flow path: 121 . . . Aerosol flow path: 122 . . . Suction opening part: 126 . . . Third member (Capsule): 128 . . . Flavor source: 106a . . . Temperature measurement instructing unit: 106b Temperature state judging unit: 106c . . . Battery operation control ling unit: 106d . . . Puff action information obtaining unit: 106e . . . Notification instructing unit: 112a Temperature measurer: 112b . . . Puff detector: 112c . . . Battery operation detector: 112d . . . Output unit

The invention claimed is:

1. A power supply unit which is installed in an inhaler device, comprising:
a battery;
a controller for controlling a charging operation of the battery and a discharging operation of the battery, the discharging operation being performed when atomizing or vaporizing an inhaled component source; and
a temperature measurer for measuring temperature of the controller,
wherein the controller is configured to:
control the temperature measurer to measure the temperature of the controller, in accordance with a first cycle during the charging operation and in accordance with a second cycle during the discharging operation, the second cycle having a length different from that of the first cycle,
in response to a result of the measurement, judge a temperature state of the power supply unit, and
in response to the temperature state being judged to correspond to a temperature abnormality, control the battery to stop the charging operation or the discharging operation, and
wherein controller is further configured to:
control the temperature measurer to measure temperature of the controller in a case that a puff action performed by a user is detected after the discharging operation is stopped or in a case that a connection of the power supply unit to an external electric power source is detected after stopping of the charging operation; and
in response to the measured temperature being in a predetermined normal temperature range, control the battery to restart the discharging operation or the charging operation.

2. The power supply unit as recited in claim 1, wherein the first cycle is longer than the second cycle.

3. The power supply unit as recited in claim 1, wherein the controller further permanently prohibits the battery from performing the discharging operation, in a case that the temperature abnormality is repeatedly detected through a predetermined prohibition-related number of times of puff actions in a row.

4. The power supply unit as recited in claim 1, wherein the controller further permanently prohibits the battery from performing the charging operation, in a case that the temperature abnormality is detected through a predetermined prohibition-related number of times of charging operation in a row.

5. The power supply unit as recited in of claim 1, wherein the controller judges that the temperature state corresponds to the temperature abnormality, in a case that the measurement result shows during the discharging operation or during the charging operation the temperature of the controller, measured by the temperature measurer, is out of a first normal temperature range during the discharging operation or out of a second normal temperature range during the charging operation a predetermined number of consecutive times.

6. The power supply unit as recited in claim 5 further comprising a notifier, wherein the controller makes the notifier notify the temperature abnormality in a case that it is judged that the temperature state corresponds to the temperature abnormality.

7. The power supply unit as recited in claim 6, wherein the predetermined normal temperature range includes the first normal temperature range for restarting the discharging operation and the second normal temperature range for restarting the charging operation, and the first normal temperature range is different from the second normal temperature range.

8. The power supply unit as recited in claim 7, wherein the first normal temperature range is larger than the second normal temperature range.

9. The power supply unit as recited in claim 1, wherein the temperature measurer is constructed by using a temperature sensor which is further included in the power supply unit.

10. The power supply unit as recited in claim 1, wherein the temperature measurer is constructed to measure temperature of the controller by using a temperature characteristic of a diode which is included in the controller.

11. The power supply unit as recited in claim 1, wherein the temperature measurer is constructed to measure temperature of the controller by using a temperature characteristic of a PTC thermistor which is included in the power supply unit.

12. An inhaled device to which the power supply unit recited in claim 1 is connected in an attachable/detachable manner.

13. A method for operating a power supply unit which is installed in an inhaler device, wherein the power supply unit comprises a controller for controlling charging operation of a battery and discharging operation of the battery, the discharging operation being performed when atomizing or vaporizing an inhaled component source, and wherein the method comprises steps of:
   obtaining, from a sensor, temperature of the controller in accordance with a first cycle during the charging operation and in accordance with a second cycle during the discharging operation, the second cycle having a length different from that of the first cycle;
   judging a temperature state of the power supply unit in response to the obtained temperature;
   controlling the battery to stop the charging operation or the discharging operation in response to the temperature state being judged to correspond to a temperature abnormality;
   controlling the temperature measurer to measure temperature of the controller in a case that a puff action performed by a user is detected after the discharging operation is stopped or in a case that a connection of the power supply unit to an external electric power source is detected after stopping of the charging operation; and
   controlling the battery to restart the discharging operation or the charging operation in response to the measured temperature being in a predetermined normal temperature range.

14. An inhaled device to which the power supply unit recited in claim 2 is connected in an attachable/detachable manner.

15. An inhaled device to which the power supply unit recited in claim 3 is connected in an attachable/detachable manner.

* * * * *